(12) United States Patent
Edenfeld (10) Patent No.: US 12,228,109 B2
(45) Date of Patent: Feb. 18, 2025

(54) METHOD FOR OPERATING A WIND TURBINE AND A WIND TURBINE

(71) Applicant: General Electric Renovables Espana, S.L., Barcelona (ES)

(72) Inventor: Thomas Edenfeld, Salzbergen (DE)

(73) Assignee: General Electric Renovables Espana, S.L., Barcelona (ES)

( * ) Notice: Subject to any disclaimer, the term of this patent is extended or adjusted under 35 U.S.C. 154(b) by 5 days.

(21) Appl. No.: 18/308,697

(22) Filed: Apr. 28, 2023

(65) Prior Publication Data

US 2023/0349366 A1 Nov. 2, 2023

(30) Foreign Application Priority Data

Apr. 29, 2022 (EP) .................................. 22170718

(51) Int. Cl.
 *F03D 80/60* (2016.01)
 *H02K 7/18* (2006.01)

(52) U.S. Cl.
 CPC ............. *F03D 80/60* (2016.05); *H02K 7/183* (2013.01); *F05D 2260/20* (2013.01)

(58) Field of Classification Search
 CPC ...... F03D 80/60; H02K 7/183; F05D 2260/20
 See application file for complete search history.

(56) References Cited

U.S. PATENT DOCUMENTS

| | | | |
|---|---|---|---|
| 10,826,297 B2 | 11/2020 | Ganireddy et al. | |
| 11,056,884 B2 | 7/2021 | Kolhatkar et al. | |
| 2010/0133824 A1* | 6/2010 | Gao | F03D 17/00 290/44 |
| 2010/0133931 A1 | 6/2010 | Grant et al. | |
| 2015/0001847 A1* | 1/2015 | Oba | F03D 80/60 290/44 |
| 2017/0370349 A1* | 12/2017 | Ritter | F03D 80/80 |
| 2020/0248674 A1* | 8/2020 | Hawkins | F03D 7/044 |
| 2021/0156362 A1* | 5/2021 | Christensen | F03D 9/25 |

FOREIGN PATENT DOCUMENTS

| | | | |
|---|---|---|---|
| EP | 3651350 A1 | 5/2020 | |
| EP | 3736935 A1 | 11/2020 | |

OTHER PUBLICATIONS

European Search Report Corresponding to EP22170718 on Oct. 14, 2022.

* cited by examiner

*Primary Examiner* — Viet P Nguyen
(74) *Attorney, Agent, or Firm* — Dority & Manning, P.A.

(57) ABSTRACT

A method (1000, 2000, 3000) for operating a wind turbine (100-100*d*) is disclosed. The wind turbine includes a power conversion system (114, 118, 210, 234, 410, 420, 430) configured to provide electrical output power (P) to a grid (242), and an air-cooling system (450) configured, in a cooling mode, to cool an ambient air (28*a*) and provide the cooled ambient air as a cooling air (28*c*) to the power conversion system (114, 118, 210, 234, 410, 420, 430). The method (1000, 2000, 3000) includes operating (1100, 2100, 3100) the air-cooling system (450) in the cooling mode if at least one operating parameter (APD, RPD, TGB, TBS) of the power conversion system (114, 118, 210, 234, 410, 420, 430) is equal to or greater than a respective threshold (Th1_APD, Th1_RPD, Th1_TGB, Th1_TBS).

15 Claims, 5 Drawing Sheets

METHOD FOR OPERATING A WIND TURBINE AND A WIND TURBINE

FIELD

The present subject matter relates generally to wind turbines having a power conversion system and operating the wind turbines, in particular under hot climate conditions.

BACKGROUND

Wind power is considered one of the cleanest, most environmentally friendly energy sources presently available, and wind turbines have gained increased attention in this regard. A modern wind turbine typically includes a tower, generator, gearbox, nacelle, and a rotor with one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

With increasing rated power of wind turbines, the heat produced by the power conversion system during operation may also rise. For example, the overall produced heat may amount to about 5% or even 7% of produced electric power. In particular, the generator may produce comparatively large amounts of heat during converting the mechanical energy to electrical energy. Further, a gearboxes of the power conversion system optionally arranged between rotor and the generator may be required to be lubricated and cooled to function effectively. Further, a frequency converter that converts the electrical power from the speed variable generator into an electrical power that matches with grid frequency and voltage may also produce large amounts of heat during this conversion. Other components used in the electrical drivetrain of a wind turbine which may provide heat are the MV transformer and power cabling.

For cooling on or more components in the nacelle, external air may be provided to an internal heat exchanger using a fan, and the heated air may be discharged from the nacelle via an exhaust duct. Alternatively, a liquid cooling may be provided using a passive heat exchanger installed on an external surface of the nacelle.

As wind turbines are typically designed to their limits to reduce costs as well as the environmental footprint during manufacturing the wind turbine, the wind turbine provided with a cooling system as described above may not be able to deliver its rated output power during high temperature conditions and/or non-favorable grid conditions. In this situation, the turbine controller starts to curtail the turbine on active power and/or reactive power. To nevertheless be compliant with grid codes during these typically rare conditions where ambient temperatures are high, expensive VAR (reactive power) compensation devices for providing fast-acting reactive power may be added for the wind turbine and on wind farm level, respectively.

In view of the above, the present disclosure provides a method for operating a wind turbine according to claim 1, a wind turbine according to claim 9, and a computer program product or a computer-readable storage medium according to claim 15.

BRIEF DESCRIPTION

Aspects and advantages of the invention will be set forth in part in the following description, or may be obvious from the description, or may be learned through practice of the invention.

In one aspect, the present disclosure is directed to a method for operating a wind turbine. The wind turbine includes a power conversion system configured to provide electrical output power to a grid, and an air-cooling system configured, in a cooling mode, to cool an ambient air and provide the cooled ambient air as a cooling air to the power conversion system. The method includes operating the air-cooling system in the cooling mode if at least one operating parameter of the power conversion system is equal to or greater than a respective threshold.

Accordingly, the power conversion system may efficiently be cooled even if the ambient temperature and, thus, the temperature of the ambient air received from outside the wind turbine, in particular from outside the wind turbine's nacelle is comparatively high, for example above 30° C., above 35° C. or even above 40° C.

The additional cooling of the ambient air allows for avoiding power curtailment and, thus, providing active power and/or reactive power as desired in accordance with grid code requirement at higher ambient temperature without the need for VAR compensation devices such as a STATCOM (Static Synchronous Compensator) and a capacitor bank, respectively. In particular, the grid can be supported in non-favorable grid conditions such as a weak grid.

This applies both for operating the wind turbine under normal operating conditions, i.e. within in the rated wind speed range, and at lower wind speeds or even at no windspeed. Note that using the air conditioning system will, compared to using a passive cooler e.g. on top of the turbine, allow a converter of the power conversion system to operate at higher VAR levels also in case there is no wind.

The air-cooling system is typically configured to remove heat from the ambient air with a cooling efficiency of at least 2, more typically of at least 3.

The air-cooling system may in particular be provided by an air conditioning system.

For example, air conditioning system may be configured to produce about 3 kW of cooling power per 1 kW of consumed electrical energy.

As wind turbine generators also have a very high efficiency of e.g. about 97%, there is a large effect on output power (produced power of generator minus consumed power of the additional air-cooling system typically received via an internal electric power distribution system) if the temperature of the coolant air is reduced by the air-cooling system (e.g. the air conditioning system).

For example, assuming a wind turbine of 6 MW rated power, using of a 20 kW air conditioning system (at 6 kW input power) will allow to reduce the cooling temperature by at least 5 K, for example up to 6° K which will allow at least about 150 kW of additional active power in case thermal limits (cooling without using the air additional conditioning system) are reached. Similar numbers apply for the reactive power.

This illustrates that using a comparatively small level of electrical power from the generator to feed an additional air-cooling system, which is typically implemented as an air conditioning system, allows the wind turbine generator to provide up to 25 times more active/reactive power once the system reach thermal limits without the additional air-cooling system because of high ambient temperatures.

Accordingly, investment in infrastructure as the need of VAR compensation devices is no longer desired because the wind turbine's power conversion system may still provide the necessary VAR compensation at higher ambient temperatures when provided with the additional air-cooling system.

Further, the annual energy production (AEP) may be increased. This is because curtailment at higher ambient temperature may at least be reduced.

Alternatively or in addition, other power conversion components of the power conversion system than the generator, in particular a gearbox arranged between the rotor and the generator, a power conversion assembly such as a power converter connected to the generator, and/or a transformer connected with the generator and/or the power conversion assembly are cooled using the cooling air provided by the additional air-cooling system if desired. Furthermore, an electric cabinet connected with one or more power conversion components of the power conversion system may be cooled using the cooling air provided by the additional air-cooling system if desired.

This typically result in analogous advantages, however, typically to a smaller extend compared to cooling the generator based on the cooling air provided by the additional air-cooling system.

Note that the power conversion system typically includes several power conversion components which are configured to contribute in converting input motive power into the electrical output power to be provided to the grid, in particular a utility grid, if the input motive power is received from the rotor of the wind turbine.

The air-cooling system may either be operated in the cooling mode irrespective of the actual temperature of the power conversion system and the power conversion component(s) of the power conversion system, respectively, or depending on the respective temperature(s). The latter allows for only operating the air-cooling system in the cooling mode (and thus consuming electric power) if actually desired for thermal reasons.

However, it is also possible to operate the air-cooling system in the cooling mode independent of the temperature(s) of the power conversion system, but e.g. based on the ambient temperature, more particular if a temperature of the ambient air is equal to or greater than an ambient temperature threshold. This control scheme may, compared to operating the air-cooling system in the cooling mode depending on the temperature(s) of the power conversion system, be simpler but may result in a somewhat lower AEP (still higher compared to using uncooled ambient air for cooling).

For reasons of efficiency, the air-cooling system is operated in the cooling mode only if a reactive power demand of the power conversion system is equal to or greater than a reactive power demand threshold, and/or if an active power demand of the power conversion system is equal to or greater than an active power demand threshold.

Otherwise, the (uncooled) ambient air is likely to be sufficient to remove heat from the power conversion system and cooling of the the power conversion system, respectively.

The air-cooling system may in particular (only) be operated in the cooling mode if at least one of the following conditions is met:
 a temperature of the cooling air is equal to or greater than a cooling air temperature threshold;
 a temperature of at least one power conversion component of the power conversion system is equal to or greater than a respective first temperature threshold; and
 the temperature of the at least one of the power conversion components is equal to or larger than a respective second temperature threshold smaller than the respective first temperature threshold.

The cooling mode of the air-cooling system may even depend on the respective temperature(s).

In particular, a cooling power of the air-cooling system may depend on at least one of the temperature of the ambient air, the temperature of the cooling air, and a (at least one) temperature of the power conversion system.

In one embodiment of a method for operating a wind turbine including a power conversion system and an air-cooling system, the method includes controlling the air-cooling system to cool an ambient air and to provide the cooled ambient air as a cooling air to the power conversion system depending on at least one operating parameter of the wind turbine, in particular depending on at least one operating parameter of the power conversion system.

The term "operating parameter of the power conversion system" as used herein intends any parameter that may influence and/or be used for controlling operating the power conversion system during converting input motive power into the electrical output power. The term "operating parameter of the power conversion system" typically embraces a reactive power demand, an active power demand, an active power production of the power conversion system, a reactive power production of the power conversion system, an output current of the power conversion system, an output voltage of the power conversion system, a temperature of the power conversion system and any of the components of the power conversion system, respectively, a coolant temperature of a coolant used in an inner cooling circuit of the respective component(s) of the power conversion system, but also the temperature of the ambient air and the temperature of the provided cooling air, and any combinations or functions thereof.

The air-cooling system may in particular be operated in the cooling mode depending on a least one of: the temperature of the ambient air, a coolant temperature, a temperature of a gearbox, a temperature of a power converter, a temperature of a transformer, and a temperature of the generator, in particular a temperature of a bearing of the generator and/or a temperature of a stator of the generator.

The respective temperatures are typically measured.

Different thereto, the reactive power demand and/or the active power demand are typically received, for example from a wind farm controller of a wind farm the wind turbine belongs to.

The cooling mode may be activated based on at least one of the typically measured temperature(s), the received reactive power demand, and the received active power demand.

Further, the cooling mode may (later) be deactivated based on at least one of a (later) (measured) temperature(s), a (later) received reactive power demand, and a (later) received active power demand.

As described above, the cooling air may be used to remove heat from the power conversion system.

This is typically achieved using the cooling system which receives the cooling air, and/or may include operating a cascade of three or even four cooling circuits thermally coupled to one another.

The method may further include curtailing at least one of a reactive output power of the power conversion system and a reactive output power of the power conversion system if the temperature of the power conversion system and the temperature of the at least one power conversion component of the power conversion system, respectively, is equal to or greater than a respective third temperature threshold.

The third temperature threshold is typically larger than at least one of, more typically both of the respective first temperature threshold and the respective second temperature threshold.

According to an embodiment of a method for manufacturing and/or updating (retrofitting) a wind turbine, the method includes providing a power conversion system of the wind turbine with an air-cooling system configured to cool an ambient air so that the air-cooling system can provide the cooled ambient air as a cooling air to the power conversion system of the wind turbine, in particular a cooling system for or of the power conversion system and its power converting components, respectively.

The method may in particular include thermally connecting the air-cooling system with the power conversion system for removing the heat. For example an outlet for the cooled ambient air of the air-cooling system may be connected with a cooling air inlet and/or fan of a cooling system of the power conversion system such as a heat exchanger. Further, the method typically includes electrically connecting the air-cooling system with an internal electric power distribution system of the wind turbine. Furthermore, the method may include updating a control software of a control system of the wind turbine in accordance with the control methods explained herein, in particular updating a software of a wind turbine controller.

According to an embodiment of a method, the method includes retrofitting an existing cooling system of a power conversion system of a wind turbine with an additional air-cooling system such as an air conditioning system.

The steps of the methods for operating the wind turbine as explained herein are typically performed by a control system for or even of the wind turbine. The control system is communicatively coupled with the power conversion system and the air-cooling system, and typically implemented as a controller, for example a respective turbine controller.

Note that an internal electric power distribution system of the wind turbine may be connectable with the power conversion system for receiving electric power to be distributed to the air-cooling system. In this embodiment, the power conversion system may be considered as electric power source and the air-cooling system as electric power consumer and electric load, respectively.

In another aspect, the present disclosure is directed to a computer program product or a non-transitory computer-readable storage medium comprising instructions which, when executed by one or more processors of a system, in particular a wind turbine having a control system providing the one or more processors as explained herein, cause the system to carry out the methods as explained herein.

In yet another aspect, the present disclosure is directed to a wind turbine including a rotor comprising rotor blades, an air-cooling system configured to receive ambient air, to cool the ambient air, and to provide the cooled ambient air as a cooling air, and a power conversion system mechanically connected with the rotor, electrically connectable to a utility grid, and configured to convert input motive power into electrical output power. A cooling system of the wind turbine is configured to receive the cooling air and to use the cooling air to remove heat from the power conversion system.

The power conversion system may be implemented as a DFIG-system.

The cooling system may be a cooling system of the power conversion system, in particular a cooling system that is, at lower ambient air temperature (lower than a second temperature threshold for the temperature of the ambient air), sufficient for reliably cooling (one or more of the components of) the power conversion system (without receiving the cooled ambient air from the air-cooling system).

The air-cooling system and the cooling system may be considered as a cascade of two thermally coupled cooling system.

As the air-cooling system may only be operated under specific conditions (high ambient temperature and high power request), the cooling system and the air-cooling system may also be considered as main cooling system of the power conversion system and supplementary cooling system of the power conversion system, respectively.

The (cascaded) air-cooling system and the cooling system typically implement a cascade of (at least) three cooling circuits thermally coupled to one another, for example a cascade of (at least) four cooling circuits thermally coupled to one another.

The cooling system may include one or more closed internal cooling circuits thermally connected with the power conversion system for removing the heat (from a respective power conversion component), an open cooling circuit thermally coupled with the respective closed internal cooling circuit and configured to receive the cooling air from the air-cooling system, a heat exchanger arranged between the open cooling circuit and the closed internal cooling circuit, and a main cooler configured to receive the cooling air and typically including a heat exchanger and/or being implemented as an air-liquid cooler, in particular an oil-air cooler. However, the latter may depend on the particular component to be cooled. For example, an outlet for the cooled ambient air of the air-cooling system may directly or via a liquid/liquid heat exchanger be connected with an oil cooler of a gearbox of the power conversion system.

Typically, the air-cooling system is provided by an air conditioning system.

The air-cooling system may be configured to remove heat from the ambient air at a rate of at least up to about 15 kW, more typically of at least up to about 20 kW, even more typically of at least up to about 23 kW.

Further, the air-cooling system may be configured to remove heat from the ambient air with a cooling efficiency of at least 2, more typically of at least 2.5 or even at least 3.

The power conversion system typically includes one or more power conversion component configured to contribute in converting input motive power received from the rotor into the electrical output power.

More particular, the power conversion system may include a gearbox, a generator, power conversion assembly typically including a power converter, for example a rotor-side power converter and a line-side power converter, and a transformer as respective power conversion components.

Typically, the cooling system is configured to remove heat from at least one of the power conversion components.

The power conversion component(s) may be arranged in a nacelle of the wind turbine.

The air-cooling system may at least partly be arranged in the nacelle or at the nacelle.

Typically, the power conversion system is connectable with an internal electric power distribution system (internal power grid) for providing electric power to the air-cooling system and the cooling system.

Accordingly, electric power may flow from the power conversion system, through the internal electric power distribution system, and to the air-cooling system as well as the cooling system.

Typically, the wind turbine includes at least one temperature sensor for measuring a respective temperature, in particular a temperature of the ambient air, a temperature of the cooling air, a temperature of the power conversion system, and a temperature of respective power conversion components of the power conversion system.

Furthermore, a controller of the wind turbine is typically communicatively coupled with the air-cooling system, the power conversion system, and the temperature sensor(s), and configured to control the wind turbine in accordance with the method explained herein.

These and other features, aspects and advantages of the present invention will be further supported and described with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Single features depicted in the figures are shown relatively with regards to each other and therefore are not necessarily to scale. Similar or same elements in the figures, even if displayed in different embodiments, are represented with the same reference numbers.

DETAILED DESCRIPTION OF THE INVENTION

Reference now will be made in detail to embodiments of the invention, one or more examples of which are illustrated in the drawings. Each example is provided by way of explanation of the invention, which shall not limit the invention. In fact, it will be apparent to those skilled in the art that various modifications and variations can be made in the present invention without departing from the scope or spirit of the invention, for instance, features illustrated or described as part of one embodiment can be used with another embodiment to yield a still further embodiment. Thus, it is intended that the present invention covers such modifications and variations as come within the scope of the appended claims and their equivalents.

Figure 1:
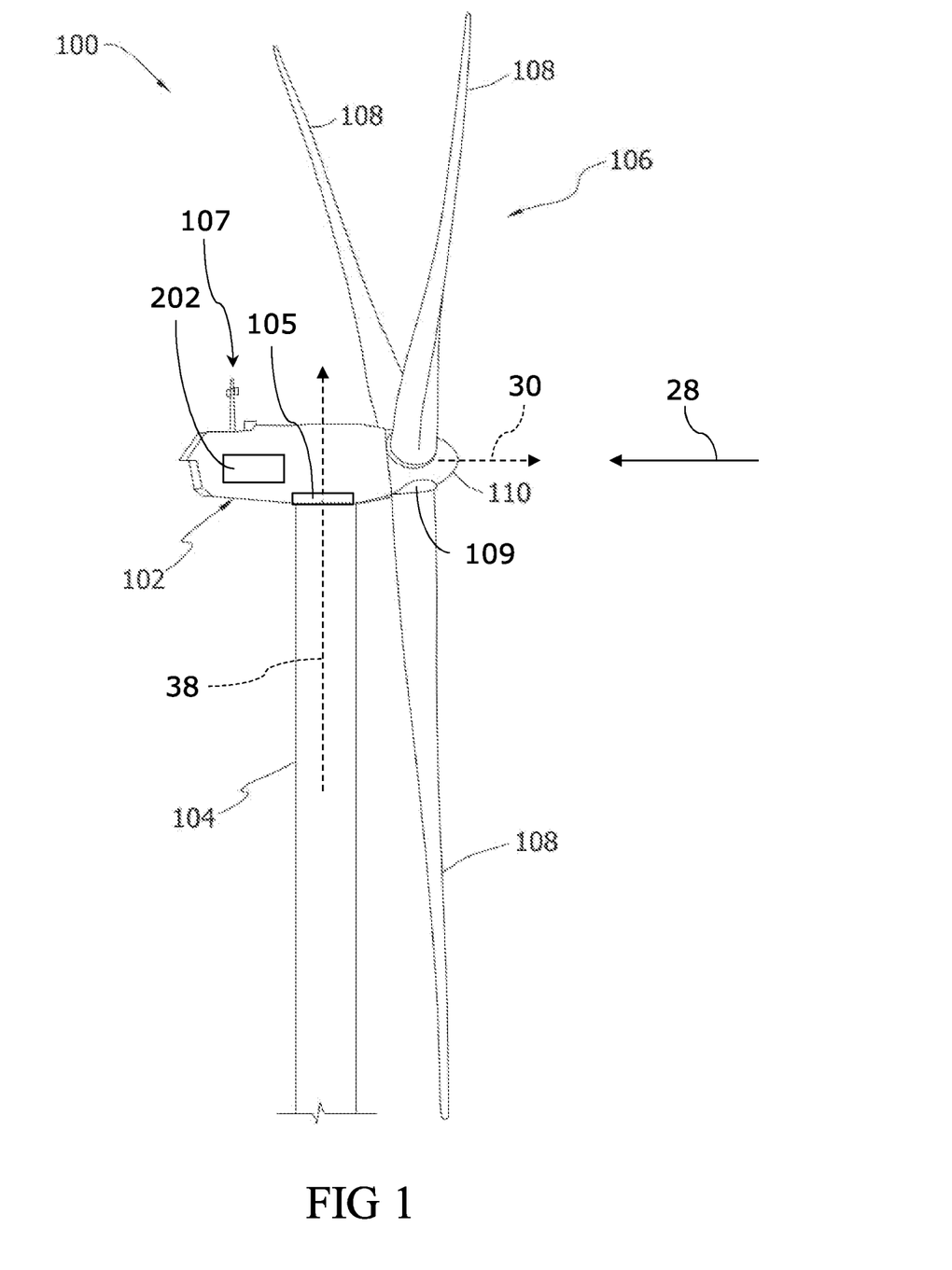
FIG. 1 illustrates a perspective view of one embodiment of a wind turbine according to the present disclosure.

FIG. 1 is a perspective view of a portion of an exemplary wind turbine 100. In the exemplary embodiment, the wind turbine 100 is a horizontal-axis wind turbine. Alternatively, the wind turbine 100 may be a vertical-axis wind turbine. Wind turbine 100 includes a nacelle 102 housing a generator (not shown in FIG. 1). Nacelle 102 is mounted on a tower 104 (a portion of tower 104 being shown in FIG. 1). Tower 104 may have any suitable height that facilitates operation of wind turbine 100 as described herein. Wind turbine 100 also includes a rotor 106 that includes three blades 108 attached to a rotating hub 110. Alternatively, wind turbine 100 includes any number of blades 108 that facilitates operation of wind turbine 100 as described herein. In the exemplary embodiment, wind turbine 100 includes a gearbox (not shown in FIG. 1) operatively coupled to rotor 106 and a generator (not shown in FIG. 1).

The rotor blades 108 are spaced about the hub 110 to facilitate rotating the rotor 106 to enable kinetic energy to be transferred from the wind into usable mechanical energy, and subsequently, electrical energy.

In one embodiment, the rotor blades 108 have a length ranging from about 15 meters (m) to about 91 m. Alternatively, rotor blades 108 may have any suitable length that enables the wind turbine 100 to function as described herein. For example, other non-limiting examples of blade lengths include 20 m or less, 37 m, 48.7 m, 50.2 m, 52.2 m or a length that is greater than 91 m. As wind strikes the rotor blades 100 from a wind direction 28, the rotor 106 is rotated about an axis of rotation 30. As the rotor blades 108 are rotated and subjected to centrifugal forces, the rotor blades 108 are also subjected to various forces and moments. As such, the rotor blades 108 may deflect and/or rotate from a neutral, or non-deflected, position to a deflected position.

Moreover, a pitch angle of the rotor blades 100, i.e., an angle that determines a perspective of the rotor blades 100 with respect to the wind direction, may be changed by a pitch system 109 to control the load and power generated by the wind turbine 100 by adjusting an angular position of at least one rotor blade 108 relative to wind vectors. During operation of the wind turbine 100, the pitch system 109 may change a pitch angle of the rotor blades 109 such that the rotor blades 109 are moved to a feathered position, such that the perspective of at least one rotor blade 100 relative to wind vectors provides a minimal surface area of the rotor blade 100 to be oriented towards the wind vectors, which facilitates reducing a rotational speed and/or facilitates a stall of the rotor 18.

A blade pitch of each rotor blade 108 may be controlled individually by a wind turbine controller 202 or by a pitch control system. Alternatively, the blade pitch for all rotor blades 108 may be controlled simultaneously by said control systems.

Further, in the exemplary embodiment, as the wind direction 28 changes, a yaw direction of the nacelle 102 may be rotated, by a yaw system 105, about a yaw axis 38 to position the rotor 106 with respect to wind direction 28.

The yaw system 105 may include a yaw drive mechanism provided by nacelle 102.

Further, yaw system 105 may also be controlled by wind turbine controller 107.

Figure 2:
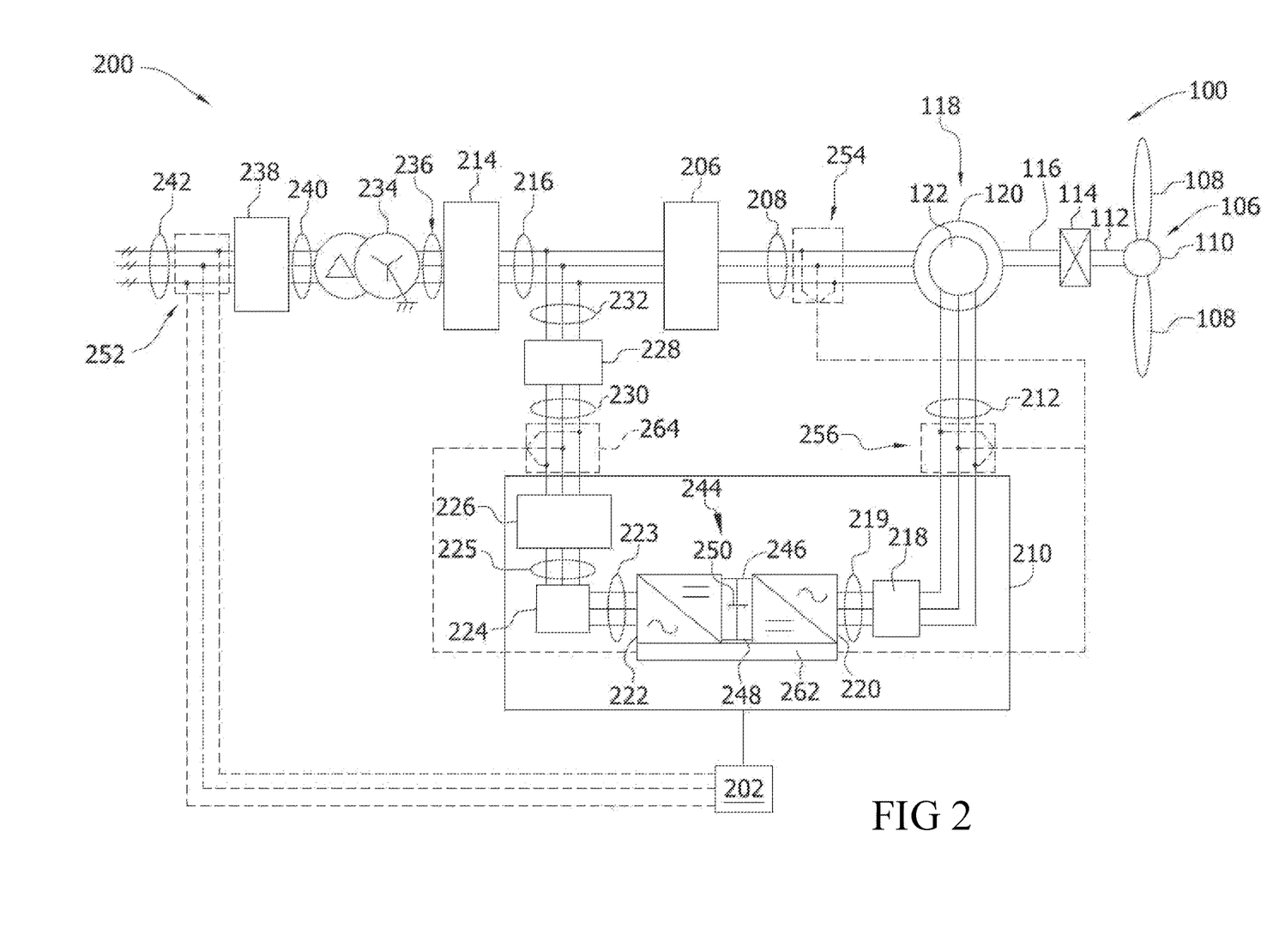
FIG. 2 illustrates a schematic view of one embodiment of an electrical power system and a control system suitable for use with the wind turbine shown in FIG. 1.

For positioning nacelle 102 appropriately with respect to the wind direction 28, the nacelle 102 may also include at least one meteorological mast 107 that may include a wind vane and anemometer (neither shown in FIG. 2). The mast 107 may provide information to the wind turbine controller 202 regarding ambient conditions. This may include wind direction and/or wind speed as well as ambient temperature, ambient moisture, precipitation type and/or amount (if any).

In the exemplary embodiment, the wind turbine controller 102 is shown as being centralized within the nacelle 102, however, the wind turbine controller may also be a distributed system throughout the wind turbine 100, on a support system (not shown in FIG. 1), within a wind farm, and/or at a remote control center. The wind turbine controller 102 includes a processor configured to perform the methods and/or steps described herein.

Referring now to FIG. 2, a schematic view of one embodiment of an electrical (power) and control system 200 that may be used with the wind turbine 100 is illustrated. During operation, wind impacts the blades 108 and the blades 108 transform wind energy into a mechanical rotational torque that rotatably drives a low-speed shaft 112 via the hub 110.

In the exemplary embodiment, the low-speed shaft 112 is configured to drive a gearbox 114 that subsequently steps up the low rotational speed of the low-speed shaft 112 to drive a high-speed shaft 116 at an increased rotational speed. The high-speed shaft 116 is generally rotatably coupled to a generator 118 so as to rotatably drive a generator rotor 122 having field winding (not shown).

More specifically, in one embodiment, the generator 118 may be a wound rotor, three-phase, doubly-fed induction (asynchronous) generator (DFIG) that includes a generator stator 120 magnetically coupled to a generator rotor 122. As such, a rotating magnetic field may be induced by the generator rotor 122 and a voltage may be induced within a generator stator 120 that is magnetically coupled to the generator rotor 122. In such embodiments, the generator 118 is configured to convert the rotational mechanical energy to a sinusoidal, three-phase alternating current (AC) electrical energy signal in the generator stator 120. The associated electrical power can be transmitted to a main transformer 234 via a stator bus 208, a stator synchronizing switch 206, a system bus 216, a main transformer circuit breaker 214, and a generator-side bus 236. The main transformer 234 steps up the voltage amplitude of the electrical power such that the transformed electrical power may be further transmitted to a grid via a grid circuit breaker 238, a breaker-side bus 240, and a grid bus 242.

In addition, the electrical power and control system 200 may include a wind turbine controller 202 configured to control any of the components of the wind turbine 100 and/or implement any of the method steps as described herein. For example, as shown particularly in FIG. 3, the controller 202 may include one or more processor(s) 204 and associated memory device(s) 207 configured to perform a variety of computer-implemented functions (e.g., performing the methods, steps, calculations and the like and storing relevant data as disclosed herein). Additionally, the controller 202 may also include a communications module to facilitate communications between the controller 202 and the various components of the wind turbine 100, e.g. any of the components of FIG. 2.

Figure 3:
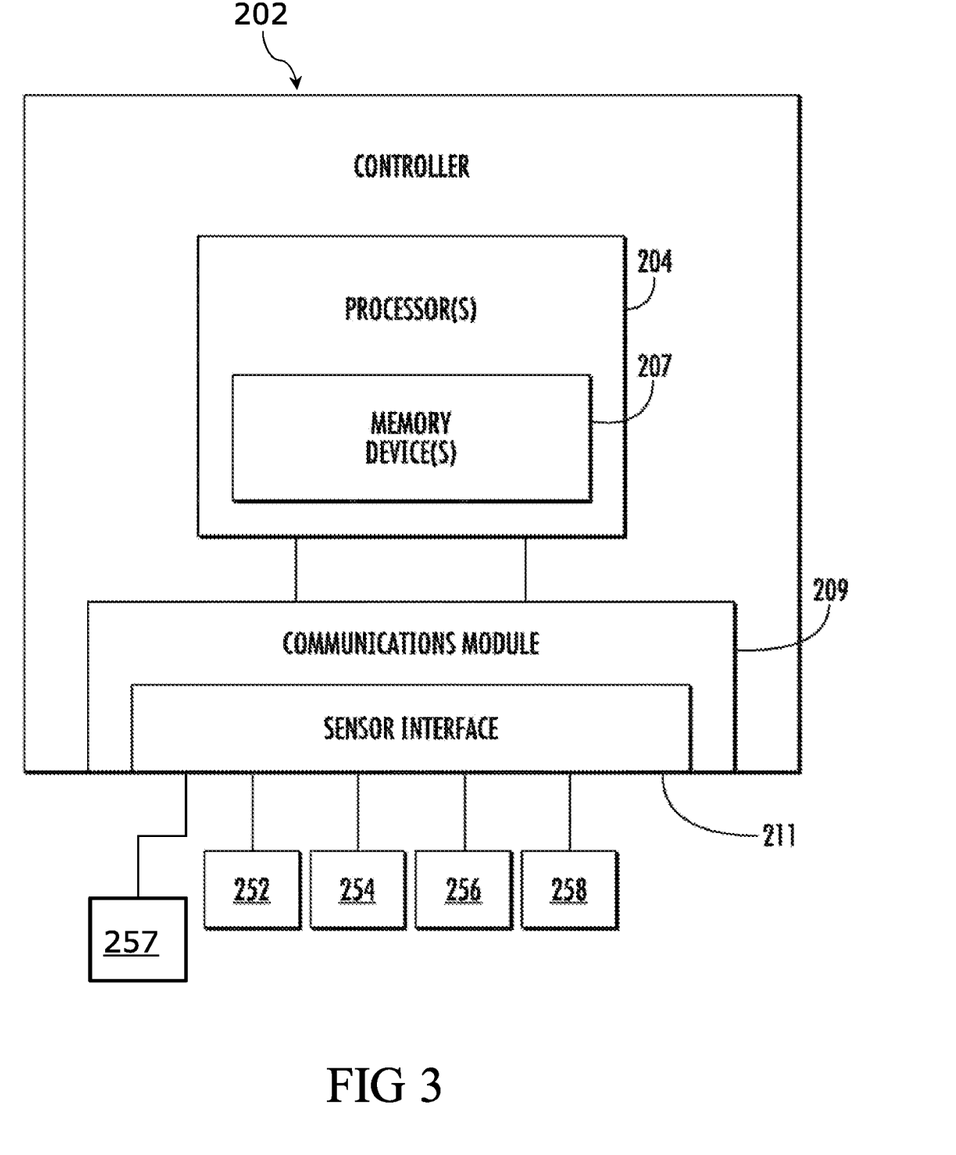
FIG. 3 illustrates a block diagram of one embodiment of a controller suitable for use with the wind turbine shown in FIG. 1.

Further, as shown in FIG. 3, the communications module 209 may include a sensor interface 211 (e.g., one or more analog-to-digital converters) to permit signals transmitted from one or more sensors to be converted into signals that can be understood and processed by the processors 204. It should be appreciated that the sensors (e.g. sensors 252, 254, 256, 257, 258) may be communicatively coupled to the communications module 209 using any suitable means. For example, as shown in FIG. 3, the sensors 252, 254, 256, 257, 258 may be coupled to the sensor interface 211 via a wired connection. However, in other embodiments, the sensors 252, 254, 256, 257, 258 may be coupled to the sensor interface 211 via a wireless connection, such as by using any suitable wireless communications protocol known in the art. As such, the processor 204 may be configured to receive one or more signals from the sensors.

The sensors 252, 254, 256 may be sensor for currents and/or voltages desired for controlling the power conversion of wind turbine 100. This is explained in more detail below.

Further, at least one sensor 258 may be provided for sensor data referring to meteorological data, e.g. sensor(s) provided by the meteorological mast 107 shown in FIG. 1. In particular an ambient air temperature sensor 258 may be provided by the meteorological mast 107.

Furthermore, at least one temperature sensor 257 may be provided for measuring temperatures within the nacelle, in particular a respective sensor for measuring a temperature of the power conversion system as explained above with regard to FIG. 2 and components thereof, respectively, and/or for measuring a temperature of the internal air flow and the cooling circuits explained in more detail below with regard to FIGS. 4A, 4B.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor 204 is also configured to compute advanced control algorithms and communicate to a variety of Ethernet or serial-based protocols (Modbus, OPC, CAN, etc.). Additionally, the memory device(s) 207 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magnetooptical disk (MOD), a digital versatile disc (DVD) and/or other suitable memory elements. Such memory device(s) 207 may generally be configured to store suitable computer-readable instructions that, when implemented by the processor(s) 204, configure the controller 202 to perform the various functions as described herein.

Referring back to FIG. 2, the generator stator 120 may be electrically coupled to a stator synchronizing switch 206 via a stator bus 208. In an exemplary embodiment, to facilitate the DFIG configuration, generator rotor 122 is electrically coupled to a bi-directional power conversion assembly 210 via a rotor bus 212. Alternatively, generator rotor 122 is electrically coupled to rotor bus 212 via any other device that facilitates operation of electrical and control system 200 as described herein. As a further alternative, electrical and control system 200 is configured as a full power conversion system (not shown) that includes a full power conversion assembly (not shown in FIG. 2) similar in design and operation to power conversion assembly 210 and electrically coupled to generator stator 120. The full power conversion assembly facilitates channeling electric power between generator stator 120 and an electric power transmission and distribution grid (not shown). In the exemplary embodiment, stator bus 208 transmits three-phase power from generator stator 120 to stator synchronizing switch 206. Rotor bus 212 transmits three-phase power from generator rotor 122 to power conversion assembly 210. In the exemplary embodiment, stator synchronizing switch 206 is electrically coupled to a main transformer circuit breaker 214 via a system bus 216. In an alternative embodiment, one or more fuses (not shown) are used instead of main transformer circuit breaker 214. In another embodiment, neither fuses nor main transformer circuit breaker 214 is used.

Power conversion assembly 210 includes a rotor filter 218 that is electrically coupled to generator rotor 122 via rotor bus 212. A rotor filter bus 219 electrically couples rotor filter 218 to a rotor-side power converter 220, and rotor-side power converter 220 is electrically coupled to a line-side power converter 222. Rotor-side power converter 220 and line-side power converter 222 are power converter bridges including power semiconductors (not shown). In the exemplary embodiment, rotor-side power converter 220 and line-side power converter 222 are configured in a three-phase, pulse width modulation (PWM) configuration including insulated gate bipolar transistor (IGBT) switching devices (not shown in FIG. 2) that operate as known in the art. Alternatively, rotor-side power converter 220 and line-side power converter 222 have any configuration using any switching devices that facilitate operation of electrical and control system 200 as described herein. Power conversion assembly 210 is coupled in electronic data communication with turbine controller 202 to control the operation of rotor-side power converter 220 and line-side power converter 222.

In the exemplary embodiment, a line-side power converter bus 223 electrically couples line-side power converter 222 to a line filter 224. Also, a line bus 225 electrically couples line filter 224 to a line contactor 226. Moreover, line contactor 226 is electrically coupled to a conversion circuit breaker 228 via a conversion circuit breaker bus 230. In addition, conversion circuit breaker 228 is electrically coupled to main transformer circuit breaker 214 via system bus 216 and a connection bus 232. Alternatively, line filter 224 is electrically coupled to system bus 216 directly via connection bus 232 and includes any suitable protection scheme (not shown) configured to account for removal of line contactor 226 and conversion circuit breaker 228 from electrical and control system 200. Main transformer circuit breaker 214 is electrically coupled to an electric power main transformer 234 via a generator-side bus 236. Main transformer 234 is electrically coupled to a grid circuit breaker 238 via a breaker-side bus 240. Grid circuit breaker 238 is connected to the electric power transmission and distribution grid via a grid bus 242. In an alternative embodiment, main transformer 234 is electrically coupled to one or more fuses (not shown), rather than to grid circuit breaker 238, via breaker-side bus 240. In another embodiment, neither fuses nor grid circuit breaker 238 is used, but rather main transformer 234 is coupled to the electric power transmission and distribution grid via breaker-side bus 240 and grid bus 242.

In the exemplary embodiment, rotor-side power converter 220 is coupled in electrical communication with line-side power converter 222 via a single direct current (DC) link 244. Alternatively, rotor-side power converter 220 and line-side power converter 222 are electrically coupled via individual and separate DC links (not shown in FIG. 2). DC link 244 includes a positive rail 246, a negative rail 248, and at least one capacitor 250 coupled between positive rail 246 and negative rail 248. Alternatively, capacitor 250 includes one or more capacitors configured in series and/or in parallel between positive rail 246 and negative rail 248.

Turbine controller 202 is configured to receive a plurality of voltage and electric current measurement signals from a first set of voltage and electric current sensors 252. Moreover, turbine controller 202 is configured to monitor and control at least some of the operational variables (also referred to as operating parameter herein) associated with wind turbine 100. In the exemplary embodiment, each of three voltage and electric current sensors 252 are electrically coupled to each one of the three phases of grid bus 242. Accordingly, a current frequency of the grid may be determined by controller 202. Alternatively or in addition, turbine controller 202 may be functionally coupled with a frequency sensor connectable with the grid. Further, it is possible that controller 202 receives the current frequency of the grid or at least a signal representative for the current frequency of the grid via primary plant controller such as a wind farm controller functionally coupled with a respective sensor.

As shown in FIG. 2, electrical and control system 200 also includes a converter controller 262 that is configured to receive a plurality of voltage and electric current measurement signals. For example, in one embodiment, converter controller 262 receives voltage and electric current measurement signals from a second set of voltage and electric current sensors 254 coupled in electronic data communication with stator bus 208. Converter controller 262 receives a third set of voltage and electric current measurement signals from a third set of voltage and electric current sensors 256 coupled in electronic data communication with rotor bus 212. Converter controller 262 also receives a fourth set of voltage and electric current measurement signals from a fourth set of voltage and electric current sensors 264 coupled in electronic data communication with conversion circuit breaker bus 230. Second set of voltage and electric current sensors 254 is substantially similar to first set of voltage and electric current sensors 252, and fourth set of voltage and electric current sensors 264 is substantially similar to third set of voltage and electric current sensors 256. Converter controller 262 is substantially similar to turbine controller 202 and is coupled in electronic data communication with turbine controller 202. Moreover, in the exemplary embodiment, converter controller 262 is physically integrated within power conversion assembly 210. Alternatively, converter controller 262 has any configuration that facilitates operation of electrical and control system 200 as described herein.

During operation, wind impacts blades 108 and blades 108 transform wind energy into a mechanical rotational torque that rotatably drives low-speed shaft 112 via hub 110. Low-speed shaft 112 drives gearbox 114 that subsequently steps up the low rotational speed of low-speed shaft 112 to drive high-speed shaft 116 at an increased rotational speed. High speed shaft 116 rotatably drives generator rotor 122. A rotating magnetic field is induced by generator rotor 122 and a voltage is induced within generator stator 120 that is magnetically coupled to generator rotor 122. Generator 118 converts the rotational mechanical energy to a sinusoidal, three-phase alternating current (AC) electrical energy signal in generator stator 120. In the exemplary embodiment, the associated electrical power is transmitted to main transformer 234 via stator bus 208, stator synchronizing switch 206, system bus 216, main transformer circuit breaker 214 and generator-side bus 236. Main transformer 234 steps up the voltage amplitude of the electrical power and the transformed electrical power is further transmitted to a grid via breaker-side bus 240, grid circuit breaker 238 and grid bus 242.

In the exemplary embodiment, a second electrical power transmission path is provided. Electrical, three-phase, sinusoidal, AC power is generated within generator rotor 122 and is transmitted to power conversion assembly 210 via rotor bus 212. Within power conversion assembly 210, the electrical power is transmitted to rotor filter 218 and the electrical power is modified for the rate of change of the PWM signals associated with rotor-side power converter 220. Rotor-side power converter 220 acts as a rectifier and rectifies the sinusoidal, three-phase AC power to DC power. The DC power is transmitted into DC link 244. Capacitor 250 facilitates mitigating DC link 244 voltage amplitude variations by facilitating mitigation of a DC ripple associated with AC rectification.

The DC power is subsequently transmitted from DC link 244 to line-side power converter 222 and line-side power converter 222 acts as an inverter configured to convert the DC electrical power from DC link 244 to three-phase, sinusoidal AC electrical power with pre-determined voltages, currents, and frequencies. This conversion is monitored and controlled via converter controller 262. The converted AC power is transmitted from line-side power converter 222 to system bus 216 via line-side power converter bus 223 and line bus 225, line contactor 226, conversion circuit breaker bus 230, conversion circuit breaker 228, and connection bus 232. Line filter 224 compensates or adjusts for harmonic currents in the electric power transmitted from line-side power converter 222. Stator synchronizing switch 206 is configured to close to facilitate connecting the three-phase power from generator stator 120 with the three-phase power from power conversion assembly 210.

Conversion circuit breaker 228, main transformer circuit breaker 214, and grid circuit breaker 238 are configured to disconnect corresponding buses, for example, when excessive current flow may damage the components of electrical and control system 200. Additional protection components are also provided including line contactor 226, which may be controlled to form a disconnect by opening a switch (not shown in FIG. 2) corresponding to each line of line bus 225.

Power conversion assembly 210 compensates or adjusts the frequency of the three-phase power from generator rotor 122 for changes, for example, in the wind speed at hub 110 and blades 108. Therefore, in this manner, mechanical and electrical rotor frequencies are decoupled from stator frequency.

Under some conditions, the bi-directional characteristics of power conversion assembly 210, and specifically, the bi-directional characteristics of rotor-side power converter 220 and line-side power converter 222, facilitate feeding back at least some of the generated electrical power into generator rotor 122. More specifically, electrical power is transmitted from system bus 216 to connection bus 232 and subsequently through conversion circuit breaker 228 and conversion circuit breaker bus 230 into power conversion assembly 210. Within power conversion assembly 210, the electrical power is transmitted through line contactor 226, line bus 225, and line-side power converter bus 223 into line-side power converter 222. Line-side power converter 222 acts as a rectifier and rectifies the sinusoidal, three-phase AC power to DC power. The DC power is transmitted into DC link 244. Capacitor 250 facilitates mitigating DC link 244 voltage amplitude variations by facilitating mitigation of a DC ripple sometimes associated with three-phase AC rectification.

The DC power is subsequently transmitted from DC link 244 to rotor-side power converter 220 and rotor-side power converter 220 acts as an inverter configured to convert the DC electrical power transmitted from DC link 244 to a three-phase, sinusoidal AC electrical power with pre-determined voltages, currents, and frequencies. This conversion is monitored and controlled via converter controller 262. The converted AC power is transmitted from rotor-side power converter 220 to rotor filter 218 via rotor filter bus 219 and is subsequently transmitted to generator rotor 122 via rotor bus 212, thereby facilitating sub-synchronous operation.

Power conversion assembly 210 is configured to receive control signals from turbine controller 202. The control signals are based on sensed conditions or operating characteristics of wind turbine 100 and electrical and control system 200. The control signals are received by turbine controller 202 and used to control operation of power conversion assembly 210. Feedback from one or more sensors may be used by electrical and control system 200 to control power conversion assembly 210 via converter controller 262 including, for example, conversion circuit breaker bus 230, stator bus and rotor bus voltages or current feedbacks via second set of voltage and electric current sensors 254, third set of voltage and electric current sensors 256, and fourth set of voltage and electric current sensors 264. Using this feedback information, and for example, switching control signals, stator synchronizing switch control signals and system circuit breaker control (trip) signals may be generated in any known manner. For example, for a grid voltage transient with predetermined characteristics, converter controller 262 will at least temporarily substantially suspend the IGBTs from conducting within line-side power converter 222. Such suspension of operation of line-side power converter 222 will substantially mitigate electric power being channeled through power conversion assembly 210 to approximately zero.

In the exemplary embodiment, generator 118, power conversion assembly 210 electrically coupled to generator 118 and step-up transformer 234 form the power conversion system of wind turbine 100.

Figures 4A, 4B, 4C:
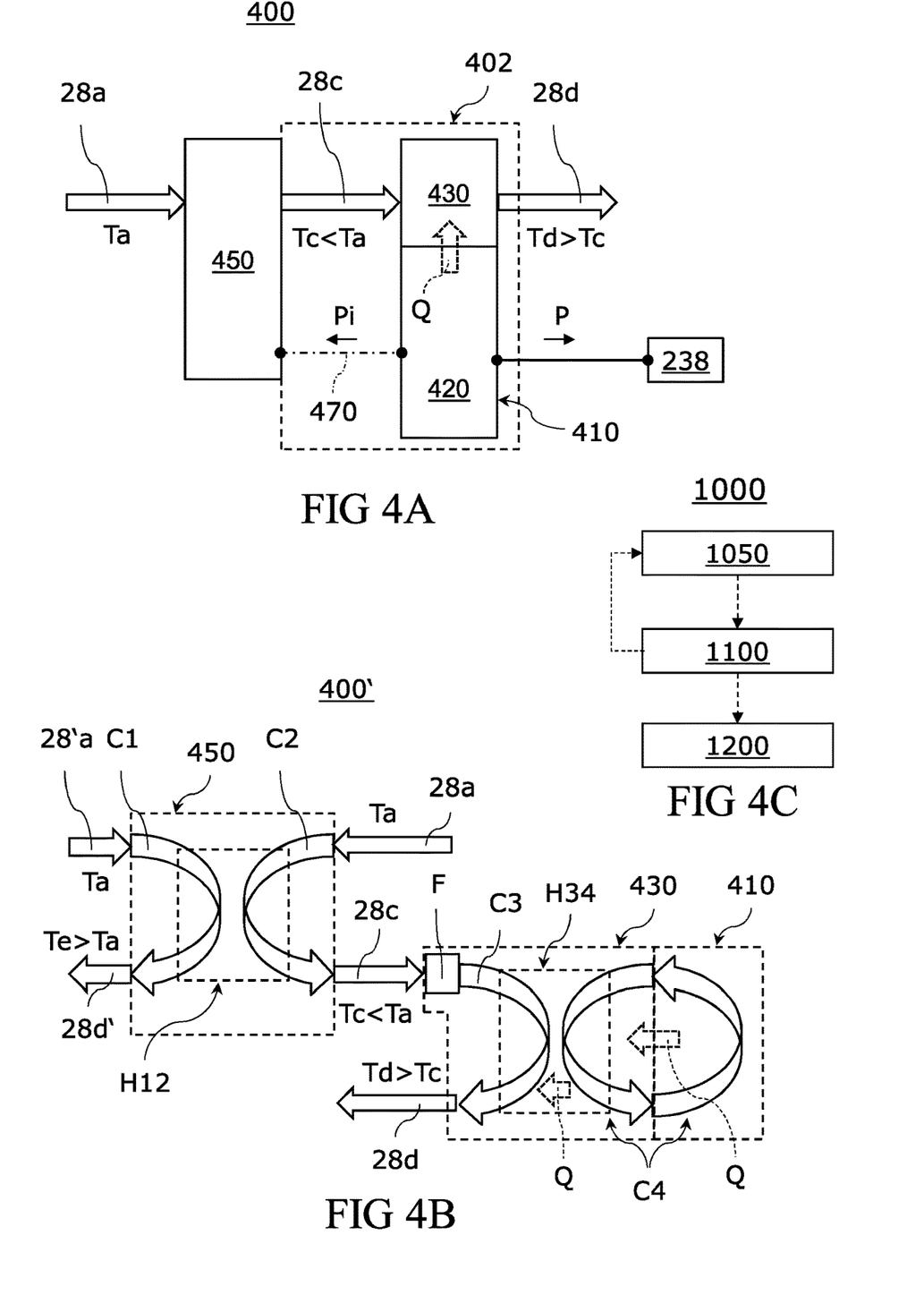
FIG. 4A illustrates a block diagram of one embodiment of a wind turbine according to the present disclosure.
FIG. 4B illustrates a block diagram of one embodiment of a wind turbine according to the present disclosure.
FIG. 4C illustrates a flow chart of a method according to an embodiment of the present disclosure.

FIG. 4A illustrates a block diagram of a wind turbine 400. Wind turbine 400 is typically similar to wind turbine 100 explained above with regard to FIG. 1 to FIG. 3 and also has a nacelle 402, a power conversion system 410 arranged in nacelle 402, mechanically connected with a rotor, and electrically connectable with a utility grid for feeding electrical output power P to the utility grid, typically via a grid circuit breaker 238 and optionally via a further transformer (outside nacelle 402), for example a wind farm transformer.

In the exemplary embodiment, an air-cooling system 450, which is typically implemented as and/or provided by an air conditioning system, is arranged on and/or at nacelle 402.

In a cooling mode, air-cooling system 450 cools the ambient air 28a received from outside nacelle 401 from ambient air temperature Ta to a lower temperature Tc, and feeds or discharges the cooled ambient air as cooling air 28c into the inner of nacelle 402, more particular towards or even to a cooling system 430 of power conversion system 410, in particular via an air supply duct arranged between an outlet of air-cooling system 450 for the cooled ambient air 28c and a cooling air inlet of cooling system 430 for removing excess heat Q from power conversion system 420. In this process, cooling air 28c is reheated and discharged from nacelle 402 as exhaust air 28d of higher temperature Td, typically via an exhaust duct.

As further illustrated in FIG. 4A, air-cooling system 450 can be provided with electric power Pi from power conversion system 420 via an internal electric power distribution system 470.

Typically, at least a generator of power conversion system 410 can be cooled using cooling system 430 which is provided with cooled ambient air 28c by air-cooling system 430 if desired, in particular at higher ambient air temperature Ta, if a high waste heat Q is to be removed and/or if the power conversion system 410 is desired to deliver large amount of (active and/or reactive) power P to the grid.

Alternatively or in addition, a gearbox, a power converter, a transformer and/or an electric cabinet of power conversion system 410 may be cooled in this way to keep the respective component below a respective threshold temperature. For example, the air conditioning system may be connected to a gearbox cooler via a liquid-liquid heat exchanger.

The temperature Tc of the cooled ambient air and cooling air 28c, respectively, and/or the temperature difference Ta–Tc may even be controllable.

Typically, the temperature of one or more of the components of power conversion system 410 are controlled by a turbine controller communicatively coupled via a data bus and/or respective data lines with air-cooling system 450, cooling system 430, power conversion system 410, power conversion components of power conversion system 410 and/or respective temperature sensors.

For cooling the power conversion system 410 and its power conversion components, respectively, cooling system 430 may have one or more closed cooling circuits for removing heat Q which are circulated with a respective coolant that can be cooled with cooling air 28c, for example one (or even more) respective closed cooling circuits for each power conversion components.

Such a closed cooling circuit is shown in FIG. 4B illustrating a block diagram of a wind turbine 400 which is typically similar to and may even correspond to wind turbine 400 explained above with regard to FIG. 4A.

In the exemplary embodiment, air-cooling system 450 includes a first open cooling circuit C1 for receiving ambient air 28' at a first inlet and a second open cooling circuit C2 for receiving ambient air 28 at a second inlet. The open cooling circuits C1, C2 are thermally coupled with each other via a heat exchanger H12 of air-cooling system 450 so that, in the cooling mode, heat is transferred from ambient air 28a received at the second inlet to ambient air 28a' received at the first inlet. While heated air of first open cooling circuit C1 is, in the cooling mode, discharged at a first outlet as first exhaust air 28d' at higher temperature Te>Ta, cooled ambient air of the second open cooling circuit C2 is discharged as cooling air 28c of lower temperature Tc<Ta at a second outlet and transferred to an exemplary fan F of a cooling system 430 for pumping cooling air 28c through an open cooling circuit C3 of cooling system 430. The open cooling circuit C3 is thermally coupled via a heat exchanger H34 of cooling system 430 with one exemplary closed cooling circuit C4 for removing heat Q from power conversion system 410.

Accordingly, a cascade of four cooling circuits C1-C4 thermally coupled to one another may be used for cooling power conversion system 410.

However, it is also possible that only three cooling circuits thermally coupled to one another are used for cooling power conversion system 410.

For example, the first open cooling circuit C1 may be omitted, for example in an embodiment in which heat exchanger H12 implemented as thermoelectric cooler, i.e. based on thermoelectric cooling of ambient air 28 in open cooling circuit C2 and the transferred heat discharged via cooling fins or the like.

However, due to the higher efficiency, heat exchanger H12 is typically implemented as a vapor-compression systems (even having an additional internal closed cooling circuit).

This may also apply to heat exchanger H34.

FIG. 4C illustrates a flow chart of a method 1000 of operating a wind turbine, in particular a wind turbine 100, 400, 400' as explained above with regard to FIG. 1 to FIG. 4B. As such the wind turbine has a power conversion system for providing electrical output power to a grid, in particular a utility grid, and an air-cooling system for providing (in a cooling mode) cooled ambient air as a cooling air to the power conversion system.

Typically during operating the wind turbine in a normal operating mode, in which the power conversion system converts input motive power received from the rotor into electrical output power and provides a least a major portion of the electrical output power to the utility grid, method 1000 includes a block (step) 1100 of operating the air-cooling system in the cooling mode and providing cooled ambient air as a cooling air to the power conversion system, respectively.

According to an embodiment, block 1100 is performed depending on at least one operating parameter of the power conversion system and/or if the at least one operating parameter is equal to or greater than a respective threshold.

Accordingly, block 1100 is typically performed depending on determining the at least one operating parameter, e.g. including measuring one or more respective temperature, or receiving the at least one operating parameter in a preceding block 1050.

As indicated by the dashed arrow in FIG. 4C, method 1000 may return from block 1100 to block 1050 at a later time to start a new control cycle.

Further, only if, despite cooling the power conversion system using the cooled ambient air as cooling air, a temperature of the power conversion system (e.g. at least one power component thereof) is equal to or greater than a respective upper temperature threshold (third temperature threshold), reactive output power of the power conversion system and/or a reactive output power of the power conversion system may be curtailed in a subsequent block 1200.

Figure 5A:
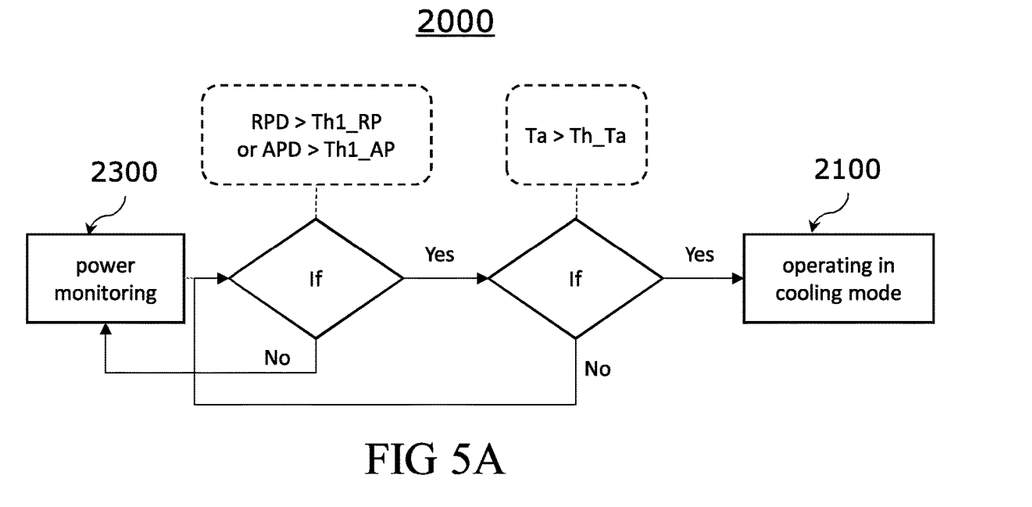
FIG. 5A illustrates a flow chart of a method according to an embodiment of the present disclosure.

FIG. 5A illustrates a flow chart of a method 2000 of operating a wind turbine, in particular a wind turbine 100, 400, 400' as explained above with regard to FIG. 1 to FIG. 4B.

Method 2000 is typically similar to method 1000 explained above with regard to FIG. 4C and also includes a block 2100 of operating the wind turbine's air-cooling system in the cooling mode. However, method 2000 is more specific.

In the exemplary embodiment, the air-cooling system is operated in the cooling mode only if both the temperature Ta of the ambient air is equal to or greater than an ambient temperature threshold Th_Ta of e.g. 30° or 35° C., and at least one of the following to conditions is met: (a) a reactive power demand RPD of the power conversion system is equal to or greater than a reactive power demand threshold Th1_RPD, and (b) an active power demand APD of the power conversion system is equal to or greater than an active power demand threshold Th1_APD.

Otherwise, the active and typically also the reactive power production of the power conversion system is controlled in a block 2300 without using the cooling mode of the air-cooling system for increasing heat removal from the power conversion system which is not desired under this conditions.

Method 2000 may be considered as proactively increasing the heat removal from the power conversion system at high power demand and high ambient temperature which otherwise may result in to high thermal loads for components of the power conversion system.

To reduce control induced fluctuations and/or to save energy, air-cooling system may also only be operated in the cooling mode if the above conditions (Ta>=Th_Ta and (RPD>Th1_RPD or APD>=Th1_APD)) are met for a respective predetermined time period of e.g. one or several seconds.

Figure 5B:
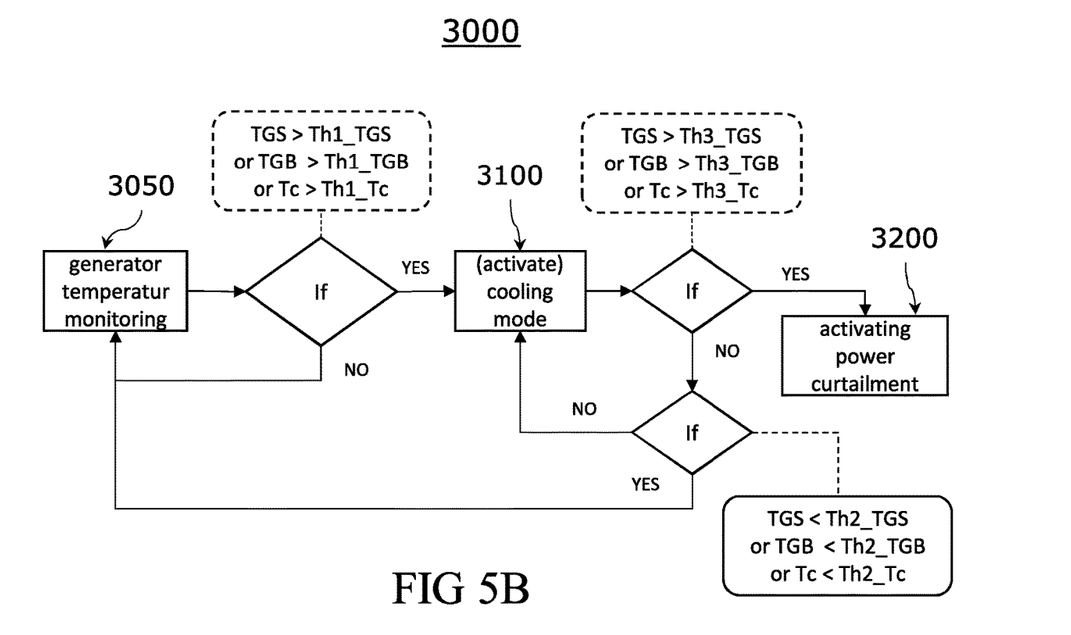
FIG. 5B illustrates a flow chart of a method according to an embodiment of the present disclosure.

FIG. 5B illustrates a flow chart of a method 3000 of operating a wind turbine, in particular a wind turbine 100, 400, 400' as explained above with regard to FIG. 1 to FIG. 4B.

Method 3000 is typically also similar to method 1000 explained above with regard to FIG. 4C and also includes a corresponding block 2100 of (activating or maintaining) operating the wind turbine's air-cooling system in the cooling mode. However, method 3000 is more specific.

In the exemplary embodiment, the cooling mode is activated in block 3100 if a temperature Tc of the cooling air is equal to or greater than a first cooling air temperature threshold Th1_Tc, if a temperature TGS of a generator stator is equal to or greater than a first generator stator temperature threshold Th1_TGS, or if a temperature TGB of a generator bearing is equal to or greater than a first generator bearing temperature threshold Th1_TGB.

The temperatures Tc, TGS and TGB are typically monitored in a block 3050.

After activating the cooling mode, it may be checked if the temperatures Tc, TGS and TGB nevertheless exceed or at least reach a respective higher third temperature threshold Th3_Tc (>Th1_Tc), Th3_TGS (>Th1_TGS), Th3_TGB (>Th1_TGB).

If so, power curtailment may be activated for the power conversion system to avoid over heating in a block 3200.

Otherwise, it may be checked if all temperatures Tc, TGS and TGB are below a respective second temperature threshold Th2_Tc (Th2_Tc<Th1_Tc), Th2_TGS (Th2_TGS<Th1_TGS), Th2_TGB (Th2_TGS<Th1_TGS).

If so, the cooling mode may be deactivated and method 3000 may return to block 3050. Otherwise, cooling mode is maintained.

Compared to method 2000 explained above with regard to FIG. 5A, air-cooling system is operated in the cooling mode depending on the monitored generator temperatures. Accordingly, the cooling mode is only used when actually desired.

Alternatively or in addition, the temperatures of other power conversion components may be taken into account for controlling (activating/deactivating) the cooling mode.

Furthermore, one or more thermal properties of the wind turbine and its components, respectively, in particular the power conversion component(s), such as respective thermal time constants may be taken into account for controlling the cooling mode (operating the air-cooling system).

Although specific features of various embodiments of the invention may be shown in some drawings and not in others, this is for convenience only. In accordance with the principles of the invention, any feature of a drawing may be referenced and/or claimed in combination with any feature of any other drawing.

Embodiments of the present invention have been described above with reference to block diagrams and flowchart illustrations of methods, apparatuses (i.e., systems) and computer program products. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus, such as the processor(s) 204 discussed above with reference to FIG. 3, to produce a machine, such that the instructions which execute on the computer or other programmable data processing apparatus create a means for implementing the functions specified in the flowchart block or blocks.

These computer program instructions may also be stored in a non-transitory computer-readable memory that can direct a computer or other programmable data processing apparatus (e.g., processor(s) 204 of FIG. 3) to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

This written description uses examples to disclose the invention, including the best mode, and also to enable any person skilled in the art to practice the invention, including making and using any devices or systems and performing any incorporated methods. While various specific embodiments have been disclosed in the foregoing, those skilled in the art will recognize that the spirit and scope of the claims allows for equally effective modifications. Especially, mutually non-exclusive features of the embodiments described above may be combined with each other. The patentable scope of the invention is defined by the claims, and may include other examples that occur to those skilled in the art. For example, at least one of the power conversion components such as the transformer may at least partly be located in the tower or a base instead of the nacelle. Such other examples are intended to be within the scope of the claims if they have structural elements that do not differ from the literal language of the claims, or if they include equivalent structural elements with insubstantial differences from the literal language of the claims.

REFERENCE NUMBERS wind turbine 100, 400, 400'
nacelle 102, 402 tower 104
yaw system 105
rotor 106
meteorological mast 107
blades 108
pitch system 109
hub 110
low speed shaft 112
gearbox 114
generator 118
generator stator 120
generator rotor 122
control system 200
turbine controller 202
processor 204
synchronizing switch 206
memory 207
stator bus 208
communications module 209
power conversion assembly 210, 410
sensor interface 211
rotor bus 212
transformer circuit breaker 214
system bus 216
rotor filter 218
filter bus 219
rotor-side power converter 220
line side power converter 222
line side power converter bus 223
line filter 224
line bus 225
line contactor 226
conversion circuit breaker 228
conversion circuit breaker bus 230
connection bus 232
electric power main transformer 234
generator-side bus 236
grid circuit breaker 238
breaker-side bus 240
distribution grid via a grid bus 242
DC link 244
positive rail 246
negative rail 248
capacitor 250
electric current sensors 252
electric current sensors 254
electric current sensors 256
temperature sensors 257, 258
converter controller 262
electric current sensors 264
cooling system 430
air-cooling system 450
internal grid 470
method, method steps 1000-3200
reactive power demand RPD
active power demand APD
temperature of stator TGS
temperature of bearing TGB
temperature Ta-Td
thresholds for parameter Th*_parameter
cooling circuits C1-C4
fan F
heat exchanger H12, H34
power P
heat Q

The invention claimed is:

1. A method for operating a wind turbine, the wind turbine having a power conversion system configured to provide electrical output power (P) to a grid, and an air-cooling system configured, in a cooling mode, to cool an ambient air and provide the cooled ambient air as a cooling air to the power conversion system, the method comprising:

operating the air-cooling system in the cooling mode when at least one operating parameter of the power conversion system is equal to or greater than a respective threshold value; and in the cooling mode, the air-cooling system reducing a temperature of the ambient air (Ta) to a cooled temperature (Tc) of the ambient air that is less than (Ta) prior to introducing the cooled ambient air to the power conversion system.

2. The method of claim 1, wherein the air-cooling system is operated in the cooling mode when at least one of the following operating parameters is met:

a reactive power demand of the power conversion system is equal to or greater than a reactive power demand threshold;

an active power demand of the power conversion system is equal to or greater than an active power demand threshold;

a temperature of the ambient air is equal to or greater than an ambient temperature threshold;

a temperature of the cooling air is equal to or greater than a cooling air temperature threshold;

a temperature of at least one power conversion component of the power conversion system is equal to or greater than a respective first temperature threshold; and the temperature of the at least one of the power conversion component is equal to or larger than a respective second temperature threshold smaller than the respective first temperature threshold.

3. The method of claim 2, wherein the air-cooling system is operated in the cooling mode when the temperature of at least one power conversion component of the power conversion system is equal to or greater than the respective first temperature threshold; or the temperature of the at least one of the power conversion component is equal to or larger than the respective second temperature threshold smaller than the respective first temperature threshold.

4. The method of claim 3, wherein the at least one power conversion component is one or more of: a gearbox, a temperature of a power converter, a transformer, or a component of a generator.

5. The method of claim 3, wherein the air-cooling system is operated in the cooling mode when one of the operating parameters is met irrespective of the temperature of the at least one power conversion component of the power conversion system.

6. The method of claim 3, further comprising curtailing at least one of the reactive output power of the power conversion system or the active output power of the power conversion system when the temperature of the at least one power conversion component of the power conversion system is equal to or greater than a respective third temperature threshold, the third temperature threshold being larger than at least one of the respective first temperature threshold or the respective second temperature threshold.

7. The method of claim 1, further comprising at least one of:
  measuring a respective temperature;
  receiving a reactive power demand;
  receiving an active power demand;
  activating the cooling mode based on at least one of the measured temperature, the received reactive power demand, the received active power demand;
  deactivating the cooling mode based on at least one of the measured temperature, the received reactive power demand, and the received active power demand; and
  using the cooling air to remove heat from the power conversion system;
  operating a cascade of three cooling circuits thermally coupled to one another to provide the cooling air; and
  operating a cascade of four cooling circuits thermally coupled to one another to provide the cooling air.

8. A wind turbine, comprising:
  a rotor comprising rotor blades;
  an air-cooling system configured to receive ambient air, to cool the ambient air to below an ambient air temperature, and to provide the cooled ambient air as a cooling air;
  a power conversion system mechanically connected with the rotor and electrically connectable to a utility grid, the power conversion system configured to convert input motive power into electrical output power; and
  a cooling system configured to receive and use introduce the cooling air to the power conversion system to remove heat from the power conversion system.

9. The wind turbine of claim 8, wherein the air-cooling system and the cooling system are configured in accordance with one of:
  a cascade of three cooling circuits thermally coupled to one another;
  a cascade of four cooling circuits thermally coupled to one another; or
  the air-cooling system is provided by an air conditioning system and is configured to remove heat from the ambient air at a rate of at least up to about 15 kW or with a cooling efficiency of at least 2.

10. The wind turbine of claim 8, wherein the power conversion system is configured to convert the input motive power into both active output power and reactive output power comprises and comprises one or more of the following power conversion components arranged in a nacelle: a gearbox, a generator, a power conversion assembly, or a transformer, wherein the cooling system is configured to remove heat from the power conversion components, wherein the air-cooling system is at least partly arranged in or at the nacelle, and wherein the cooling system comprises at least one of:
  a closed internal cooling circuit fluidically connected with the power conversion system for removing the heat;
  an open cooling circuit thermally coupled with the closed internal cooling circuit and configured to receive the cooling air;
  a heat exchanger arranged between the open cooling circuit and the closed internal cooling circuit; or
  a main cooler configured to receive the cooling air, the main cooler comprising one of a liquid-liquid heat exchanger or an air-liquid cooler.

11. The wind turbine of claim 8, further comprising a controller communicatively coupled with the air-cooling system, the power conversion system, and at least one temperature sensor, the controller configured to carry out the method according to claim 1.

12. The wind turbine of claim 11, wherein the temperature sensor is configured to measure a respective temperature of at least one of: the ambient air, the cooling air, or at least one power conversion component of the power conversion system.

13. The wind turbine of claim 8, wherein the cooling system comprises a fan and a heat exchanger for the power conversion system that are provided with the cooling air.

14. The wind turbine of claim 8, wherein the power conversion system and the air-cooling system are connectable with an internal electric power distribution system wherein the air-cooling system is provided with electric power from the power conversion system.

15. A computer program product or a non-transitory computer-readable storage medium comprising instructions which, when executed by one or more processors of a control system of a wind turbine cause the control system to carry out the method of claim 1.

* * * * *